United States Patent
Ibrahim

(10) Patent No.: US 10,691,426 B2
(45) Date of Patent: Jun. 23, 2020

(54) BUILDING FLEXIBLE RELATIONSHIPS BETWEEN REUSABLE SOFTWARE COMPONENTS AND DATA OBJECTS

(71) Applicant: Saudi Arabian Oil Company, Dhahran (SA)

(72) Inventor: Abdallah K. Ibrahim, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 78 days.

(21) Appl. No.: 15/794,858

(22) Filed: Oct. 26, 2017

(65) Prior Publication Data

US 2019/0129696 A1    May 2, 2019

(51) Int. Cl.
*G06F 8/36* (2018.01)
*G06F 9/448* (2018.01)
*G06F 8/20* (2018.01)

(52) U.S. Cl.
CPC ............. *G06F 8/36* (2013.01); *G06F 8/24* (2013.01); *G06F 9/449* (2018.02); *G06F 9/4493* (2018.02)

(58) Field of Classification Search
CPC ............ G06F 9/449; G06F 9/4493; G06F 8/24
See application file for complete search history.

(56) References Cited

U.S. PATENT DOCUMENTS

| | | | | |
|---|---|---|---|---|
| 7,080,361 B2* | 7/2006 | Aigen | ............... | G06F 16/289 717/137 |
| 7,089,262 B2* | 8/2006 | Owens | ............... | G06Q 40/02 |
| 7,747,625 B2* | 6/2010 | Gargi | ............... | G06F 16/58 707/737 |
| 7,788,275 B2* | 8/2010 | Warren | ............... | G06F 16/289 707/763 |
| 8,037,449 B2* | 10/2011 | Iborra | ............... | G06F 8/30 717/105 |
| 8,260,824 B2* | 9/2012 | Mao | ............... | G06F 16/288 707/803 |
| 8,527,943 B1* | 9/2013 | Chiluvuri | ............... | G06F 8/36 717/106 |
| 8,887,132 B1* | 11/2014 | Hunter | ............... | G06F 9/44505 717/111 |
| 10,489,486 B2* | 11/2019 | Calvin | ............... | G06F 3/04842 |

(Continued)

OTHER PUBLICATIONS

"Object-Relational Mapping," Wikipedia, https://en.wikipedia.org/wiki/Object-relational_mapping, last edited Jul. 7, 2017, published on or before Jul. 2016, 5 pages.

(Continued)

*Primary Examiner* — Chat C Do
*Assistant Examiner* — Douglas M Slachta
(74) *Attorney, Agent, or Firm* — Fish & Richardson P.C.

(57) ABSTRACT

At design-time, an owner data object and a container reference object are defined. At runtime, an instance of the defined owner data object an instance of defined relationship construction parameters are instantiated. At runtime, an instance of the defined container reference object and an instance of a defined data source object are instantiated using the instantiated relationship construction parameters. At runtime, an instance of a defined target data object is instantiated by calling an interface of the instantiated data source object. At runtime, the instance of the target data object is cached in the instance of the container reference object.

17 Claims, 4 Drawing Sheets

(56) References Cited

U.S. PATENT DOCUMENTS

| | | | |
|---|---|---|---|
| 2001/0052032 A1* | 12/2001 | Williamson | G06F 8/24 719/315 |
| 2006/0143227 A1 | 6/2006 | Helm et al. | |
| 2006/0155755 A1* | 7/2006 | Elul | G06F 9/4488 |
| 2007/0027906 A1* | 2/2007 | Meijer | G06F 16/289 |
| 2007/0027907 A1* | 2/2007 | Kulkarni | G06F 8/24 |
| 2007/0039008 A1* | 2/2007 | Williamson | G06F 8/24 719/313 |
| 2007/0220199 A1* | 9/2007 | Moore | G06F 16/256 711/112 |
| 2007/0294311 A1* | 12/2007 | Gates | G11B 27/32 |
| 2008/0281862 A1* | 11/2008 | Balasubramanian | G06F 9/4493 |
| 2009/0083314 A1* | 3/2009 | Maim | G06F 17/2211 |
| 2010/0153412 A1* | 6/2010 | Mavrov | G06F 16/2423 707/758 |
| 2011/0161942 A1 | 6/2011 | Brunswig et al. | |
| 2012/0054603 A1* | 3/2012 | Demant | G06F 3/0484 715/247 |
| 2012/0233182 A1* | 9/2012 | Baudel | G06F 9/451 707/748 |
| 2013/0262522 A1* | 10/2013 | van Rotterdam | G06F 17/30961 707/802 |
| 2014/0137024 A1* | 5/2014 | Curtis | G06F 3/0481 715/771 |
| 2016/0170999 A1* | 6/2016 | Cuddihy | G06F 16/252 707/722 |
| 2017/0052766 A1* | 2/2017 | Garipov | G06F 8/34 |

OTHER PUBLICATIONS

"Object Relational Mapping (ORM) Data Access—Introduction to ORM with Spring," Spring Framework 3.0, https://docs.spring.io/spring/docs/3.0.x/spring-framework-reference/html/orm.html, Copyright 2004-2010, 22 pages.

International Search Report and Written Opinion issued in International Application No. PCT/US2018/055825 dated Apr. 16, 2019, 18 pages.

Schmoelzer et al., "The Entity Container—An Object-Oriented and Model-Driven Persistency Cache," proceedings of the 38th Hawaii International Conference on System Sciences, Jan. 3, 2005, 10 pages.

* cited by examiner

BUILDING FLEXIBLE RELATIONSHIPS BETWEEN REUSABLE SOFTWARE COMPONENTS AND DATA OBJECTS

BACKGROUND

Software implementations typically lag behind rapid development and changes in various analytical, evaluative, and other processes. As a result, possible benefits due to changes in a particular process are often lost until software development, architectures, methodologies, or standards are available to efficiently implement and permit leverage of the particular process.

SUMMARY

The present disclosure describes a software architecture method (SAM) to optimize software implementations of rapidly developed or changing processes.

In an implementation, at design-time, an owner data object and a container reference object are defined. At runtime, an instance of the defined owner data object an instance of defined relationship construction parameters are instantiated. At runtime, an instance of the defined container reference object and an instance of a defined data source object are instantiated using the instantiated relationship construction parameters. At runtime, an instance of a defined target data object is instantiated by calling an interface of the instantiated data source object. At runtime, the instance of the target data object is cached in the instance of the container reference object.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, at a high-level, software implementations of a rapidly developed or changing process (Process) (for example, of an analytical or evaluative nature) used for any purpose or capacity can be optimized by providing a SAM used to efficiently build a framework of reusable relationships between reusable software components. Second, by optimizing software implementations, software quality, at least in terms of reusability, readability, consistency, clarity, and correctness, can be enhanced. Third, building the reusable relationships between the reusable software components can minimize impacts of frequent changes on a particular Process by reducing development time, simplifying maintenance, and expediting system testing—enhancing/expediting the entire software lifecycle. Fourth, through an efficient caching and fetching mechanism and optimization of database transactions, the SAM can increase overall runtime computer performance of a particular Process. Fifth, reuse of relationships between data objects (DOs) is permitted to build the described framework of reusable relationships, enabling seamless navigation between the DOs without, for example, a knowledge of the complexities of particular relationships or data locations (for example, a database, document management system, or file system), and without impacting overall processing performance. Sixth, the described approach simplifies building software programs that encode objects representing real-world entities and relationships between the objects. Seventh, the relationships between the objects permits understanding of how the objects collaborate to perform a specific domain task.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
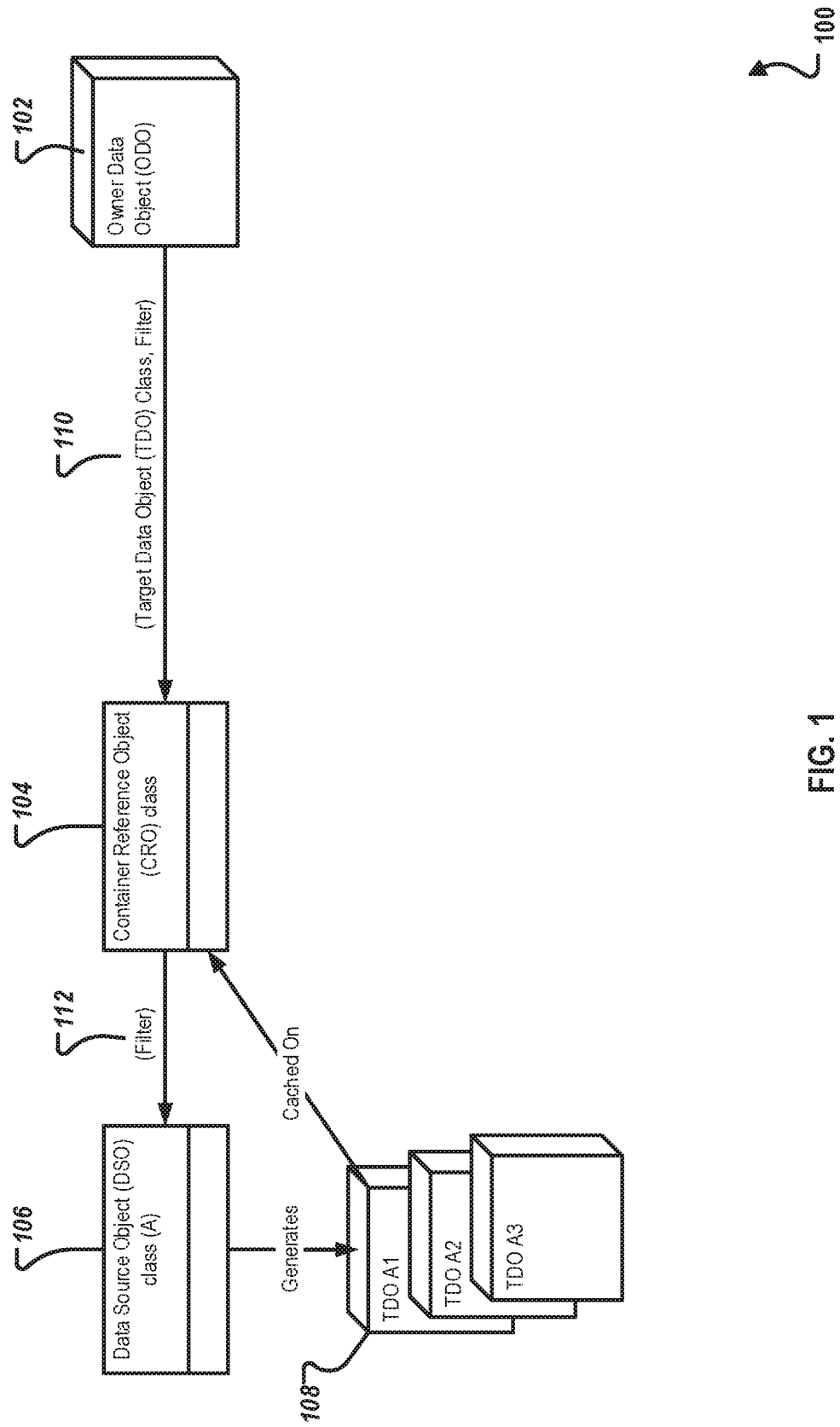
FIG. 1 is a block diagram of example relationships configured between different Data objects (DOs) in a software architecture method (SAM) for optimizing a software implementation of a rapidly developed or changing process (Process), according to an implementation of the present disclosure.

The following detailed description describes a software architecture method (SAM) to optimize software implementations of rapidly developed or changing processes, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Software implementations typically lag behind rapid development and changes in various analytical, evaluative, and other processes. As a result, possible benefits due to changes in a particular process are often lost until software development, architectures, methodologies, or standards are available to efficiently implement and permit leverage of the particular process.

At a high-level, the SAM can be used to efficiently build a framework of reusable relationships between reusable software components (for example, data objects). The SAM also permits optimization of software implementations of a rapidly developed or changing process (Process) (for example, of an analytical or evaluative nature) used for any purpose or capacity. By optimizing software implementations, software quality, at least in terms of reusability, readability, consistency, clarity, and correctness, can be enhanced. The SAM simplifies building software programs that encode data objects representing real-world entities and relationships between the objects, because the relationships between the data objects permit understanding of how the data objects collaborate to perform a specific domain task.

Building the reusable relationships between the reusable software components can minimize impacts of frequent changes on a particular Process by reducing development time, simplifying maintenance, and expediting system testing—enhancing/expediting the entire software lifecycle. Additionally, through an efficient caching and fetching mechanism and optimization of database transactions, the SAM can increase overall runtime computer performance with respect to a particular Process.

A described Container Reference Object (CRO) improves the runtime operation of a computer by providing unique and efficient mechanisms for data fetching and caching. In some implementations, the CRO fetches data, based on an on-demand fetch (for example, a lazy fetch), and caches relevant target data objects at an owner data object (for example, a data object for a hydrocarbon-production-related field (Field) would cache its related wells (Wells). In some implementations, the cache can resemble a tree-like data structure of data objects. For example, when a client application requests information about a certain entity, the relationships allow navigation from the root of the data structure through the children/sub-children entitles until a node/data object that has the required information is reached. If the same data is requested again, the target data objects are already in a cache, so there is no need to retrieve the data again from a data repository (for example, relational or non-relational database, system folder and files, document management repository, geographic information system (GIS) server location, or any other data source).

This specific fetching and caching mechanism provides client applications the ability to navigate between data objects and to perform read/write operations seamlessly without performance penalties. Also, client applications do not have to deal with infrastructure complexity associated with each domain object.

The CRO also optimizes database updates. The CRO is read/write and, in some implementations, can be configured to cache two copies of the same data. For example, if a read/write flag is set, then the CRO can cache two versions of target data objects. In this instance, one version allows a client to perform create, update, and delete operations with a target data object, while the other version preserves the data object as-is. Once the data is saved, a data source can compares the two versions to optimize data repository access. A client application (for example, at a front-end) uses one copy when requesting an update for a certain object/record. The CRO can compares that object with the cached version, identify if and which attributes have been modified, and then request a related data source to apply that specific change to the data repository. In contrast, conventional methods need to save entire data objects/records/attributes regardless of whether changes have occurred. SAM provides benefits when using a distributed multi-tier architecture, because only modified attributes/records are written to the data repository. Therefore, the SAM reduces overall database hits and allows for accurate audits associated with the data repository. This database optimization helps ensure that software is overall faster and more efficient, and helps to reduce data transfer and network bandwidth usage.

Models generated by described data objects and relationships are part of middle-tier layer of the software architecture, and used primarily by the front-end layer of the software architecture to build an output software application. For example, in an implementation, a hydrocarbon-production-related "Well") could have many attributes stored in different database tables, many operations and algorithms, many associated documents stored on document management repository, and different maps and locations stored on GIS server. A described data source (for example, a "Well" data source) has access to all (or substantially all) of this data encapsulated into itself (that is, all details of the database tables, operations, documents, and maps) where it can be accessed directly.

Data generated by the data sources is used to generate one or more data objects. Data sources implement an interface, which defines a communications protocol between the data source and the CRO. The role of data sources is to communicate with a data repository and generate target data object instances.

The SAM allows creation of a software model that can imitate real-life entities for any domain. The model executes at the middle-tier layer of the software architecture. Output can be used by a client application (for example, at the front-end layer) or by an external computing system that consumes the middle-tier services using remote access technology (for example, using web services or Representational State Transfer (REST)).

In typical implementations, the client application can include, among other things, input forms, reports and views. The SAM does not specify technologies needed for front-end implementation, but necessary interfaces are predefined to permit a wide-range of front-end implementations (for example, HTML 5/ANGULAR, JAVASERVER PAGES (JSP), JAVA STRUTS, ADOBE FLEX, or JAVA SWING) to use output entities' middle-tier (for example, a Field or Well) without a need to know middle-tier infrastructure complexity. As front-end applications and technologies frequently change, one benefit is that a front-end application/technology can be changed without a need to change an entire application. This is because the business logic is separated from the front-end.

Furthermore, the CRO allows reuse of data objects and the relationships between data objects to build a software framework that enables seamless navigation between modeled data objects (for example, a Field, reservoir (Reservoir), area (Area), or rig (Rig)). The navigation can be established without a need to know infrastructure complexity or relationships between the data objects and without impacting computing processing performance.

In typical implementations, elements of the described relationship concept include:

1. Data Object (DO)—a class or component that implements a specific interface and represents an entity (for example, in the real-world a DO could represent a hydrocarbon-production-related Field, Well, plant (Plant), Reservoir, or any other entity consistent with this disclosure). Each DO is associated with one or more behaviors that each represent a behavioral aspect of the entity (for example, a hydrocarbon-producing Field has Wells, is connected to various facilities (such as a refinery), and produces gas or oil). In the SAM, the level of communication is DO-to-DO. The referenced Target Data Object (TDO) and Owner Data Object (ODO) are a kind of DO.

2. Data Source (DS)—based on a defined interface, is the software factory that generates DO(s). The role of a DS is to communicate with a back-end computing system (for example, a database, file system, or legacy system) and to generate target DO (TDO) instances. In instances where a database is the DS, object-relational mapping (ORM) can be used to fetch and convert (for example, of an incompatible type) data and to generate specified DOs. Alternatively, other database adaptors (such as, JAVA DATABASE CONNECTIVITY (JDBC) or OPEN DATABASE CONNECTIVITY (ODBC)) can be used to fetch and customize data. A Data Source Object (DSO) class is used to instantiate an instance of a DS.

3. Filters—objects that represent a communication message between a DO and a DS. Filters are used to filter data, based on criteria established/requested by an "Owner" DO. An Owner DO (ODO) is an instantiated object that owns the relationship. For example, where a hydrocarbon-production-related Field A has a number of Wells B, the Field A can be considered the relationship owner (ODO) and individual Wells B can be considered target data objects (TDOs).

4. Application Component (AC)—used to aggregate DOs and apply particular logic to generate a function (and associated result) relevant to the rapidly developed or changing process at issue. For example, a graphical user interface (GUI) associated with a software application incorporating one or more ACs can be used to display a result of the relevant function for user analysis (particularly where functions are of an analytical or evaluative nature). In another example, ACs can be used to dynamically initiate or perform one or more particular physical/tangible actions based on the associated result (for example, initialize, operate, control, or manage one or more components of a hydrocarbon drill assembly, refinery, or pumping/transport system). These examples have been provided to aid in understanding and are not meant to limit the disclosure in any way. Any use of ACs that is consistent with the concepts presented in this disclosure is also considered to be within the scope of the disclosure.

Reuse of relationships is permitted between DOs to build the described framework of reusable relationships (a "data model") by dynamically relating data objects to other data objects. Once a data model is built, relationships enable seamless navigation between the related DOs without knowledge of the complexities of particular DO relationships or data locations (for example, a database, document management system, or file system), and without impacting overall processing performance. For example, in an implementation, to switch between "Test" and "Production" DSs, only a data source registry (DSR) needs to be changed. This is very useful during early software development stages to easily select data sources used to provide mock-up-type data for rapid prototyping or other purposes.

In typical implementations, only relationships and Filters need to be changed to associate or aggregate DOs. For example a "Well" DO can be associated with a "Field" DO, and the "Well" DO can be reused and associated with other DOs (for example, a "Field" or a "Reservoir" DO).

Domain logic and relationships are controlled at a system middle-tier. Middle-tier refers to processing that takes place in an application server that is situated between a user's computing device and a database server. The middle-tier application server performs domain logic, which is used to encode real-world rules that determine, for example, how data can be created, stored, and changed. In other words, changing an associated back-end computing system or an associated front-end (for example, a GUI software application) will not have a large impact on the overall domain logic as the domain logic is insulated in a separate architectural tier.

The SAM allows for high data encapsulation between associated components. For example, changing an implementation of a particular DO will not impact other DOs unless the interface of the particular DO is changed. Interface changes typically occur rarely. However, implementation changes are more frequent (for example, due to changing a DO-embedded algorithm or data structure or replacing an in-house developed component with a vendor-developed component). The high data encapsulation provides adaptability and extensibility as the software framework can accommodate new changes and new features with minimal impacts to the overall application. The SAM also provided enhanced portability, as any data object can be replaced or upgraded without impacting the entire system as data is encapsulated into data objects and interfaces determine communication between the objects. The low-complexity provided by the SAM simplifies design, development, and testing of a software application. The SAM is also flexible enough to permit the use of different software architectures (such as using components and class inheritance or using dependency injection) for the middle-tier without affecting either the back-end or front-end.

FIG. 1 is a block diagram of example relationships 100 configured between different DOs in a SAM for optimizing a software implementation of a Process, according to an implementation of the present disclosure. As illustrated, FIG. 1 includes an Owner DO (ODO) 102, CRO class 104, DSO class (here, "A") 106, and TDO instances 108 generated by an instance of the DSO class 106 (here, TDO A1, TDO A2, and TDO A3).

At design-time, the Owner of the ODO 102 defines one or more Owner Data Object (ODO) relationships between the ODO 102 and other DOs. For example, the Owner of the ODO 102 can define a relationship between the ODO 102 and a TDO A DO.

To instantiate a relationship object (that is, a CRO) for a defined relationship at runtime, the Owner instantiates an instance of the ODO 102 (class not illustrated) and transmits construction parameters 110 to the CRO class 104. As illustrated, the construction parameters are a TDO class (here 'A') and a defined Filter 112 as previously described. An instance of the CRO 104 is instantiated using the construction parameters 110. In some implementations, an instance of the CRO class 104 is instantiated either at the same time when the instance of the ODO 102 is instantiated as a class variable or can instantiated inside of an ODO 102 method as a method variable.

The construction parameters are passed to the CRO class 104 constructor. The passed parameters (referenced at design-time and constructed at runtime) are used by an instantiation of the CRO class 104 at runtime to locate a DSO class (for example, DSO class (A) 106) from a DSR. In some implementations, DO(s) relationships are structured as a tree-like structure in computer memory (for example, refer to FIG. 2). In the tree-like structure, the "main application component" is the AC that owns the root DO of the tree-like structure of DO(s). The DSR is used to locate a DS and associates each DO interface with a DS.

The instantiated CRO uses the located DSO class to generate a DSO (for example, an instantiation of DSO class (A) 106). The instantiated CRO calls in interface method associated with the instantiated DSO to generate one or more TDOs (for example, TDO A1, TDO A2, and TDO A3) 108. The DSO caches the TDOs 108 into the CRO (acting as a collection container) at runtime.

The SAM does not mandate how to obtain data. Meaning that data sources can be configured to collect data from any data repository, data is generated by DSO(s), and each type of DO is generated by certain DS. For example, a DSO can be configured to use web services, JDBC/ODBC adaptors, object-Relational mapping software, or any customized adaptor for any external computing system. However, in typical implementations, the interface (that is, a "contract") of how a data source communicates with the CRO container is fully defined (as a data source interface). The process of converting data to DOs can be custom or commercially obtained as long as the process complies with the interfaces contract. A requestor DO uses the TDOs cached by the CRO.

The relation between the requester DO and the defined relationship is determined by the CRO interface. The following is a simplified example for understanding (using JAVA code):

1) Define a DS registry on the main component (which associates a data source to a data object), for example:

```
register                 (FieldAreaReservoir.class,
   FieldAreaReservoirDataSource.class).
```

2) Define a relation on a requester DO (FieldGroup), for example:

```
RelationObject1to*fieldAreaReservoirs=new
   RelationObject1to*(this,FieldAreaReservoir-
   .class,IFilterList filter,true).
```

In this case, the requester DO is FieldGroup and the target DO is fieldAreaReservoirs. The forth parameter is a flag identifying that the target DOs will be subject to modification (for example, update, create, and delete).

3) Build a data source to generate DOs (fieldAreaReservoirs) using an implemented DS interface, and use the requester DO attributes in addition to a defined Filter to create target DOs. For example:

```
public interface IDataSource extends Serializable {
    public List getRelation1to* (BusinessObject owner,
IFilterList name, boolean UpdateFlag) throws Exception;
    public Object getRelation1to1(BusinessObject owner,
IFilterList name, boolean UpdateFlag) throws Exception;
    public ConnectionInfo[ ] getRelatedConnections( ) throws
Exception;
    public void Update(BusinessObject o) throws Exception;
    public void Create(BusinessObject o) throws Exception;
    public void Delete(BusinessObject o) throws Exception;
    ...
}.
```

4) The Requester DO (FieldGroup) gets the related target DOs (FieldAreaReservoir) from the defined relation, for example:

```
FieldAreaReservoir           fieldAreaReservoir    =
   (FieldAreaReservoir)   FieldGroup.  fieldAreaReservoirs
   ( ).get(0).
```

In typical implementations, the CRO implements a standard collection interface and adds defined logic to implement the previously-mentioned lazy-type fetch for a TDO instance. Criteria for the lazy-fetch depends on attributes of a requester DO as well as the defined Filter 112. The Filter 112 can be predefined or can be created dynamically during execution of the application. For example, in some implementations, the CRO inherits a standard collection container (such as, ArrayList or Victor in JAVA). The CRO collection container is used to cache/store the generated TDO(s) (that is, as elements of a collection). In typical implementations, a CRO interface definition includes the standard collection interface (for example, JAVA List collection) with an addition of some extra methods to auto locate a related DS.

The use of the CRO can reduce time and cost for completing software projects because relationships (that is, a software framework) are utilized that map real-life entities into software models. The software framework reduces overall implementation complexity and expedites development and upgrades of software applications. For example, if an algorithm is modified, the middle tier implementation can be quickly updated while leaving the back-end and front-end implementations intact (or with minor updates, if necessary). In this way, an entire application does not need to be re-engineered. Also, overall computer performance can be monitored/controlled for each part of the architecture. For example, if a middle-tier update adversely affects the overall application performance, the focus can be to determine the issue at the middle tier without wasting resources working on the front-end or back-end portions of the application.

Typically, TDO instances are instantiated when needed, saving computing system resources and preventing unnecessary processing. The CRO can dynamically locate the requested TDO class data source (for example, the instantiated DSO from DSO class 106) and calls an appropriate interface exposed by the DSO with the Filter 112 construction parameter.

The DSO generates an instance of the TDO 108 (for example, TDO A1 108). The instance of the TDO is then cached by the CRO. The SAM allows for a structured memory caching. Once the OBO 102 uses the defined relationship, related TDOs are also cached and can be reused (that is, the DSO need only generate the data once). This process also improves overall computing system performance by performing as-needed computing.

A DSO is an instantiated version of a DS class. The DSO is a factory that can generates one or more target DOs. Each DS can be configured to generate a specific type of DO at runtime. The DSR determines dynamically which DS will be used to generate a particular target DO. A DO can be generated by different DS(s), and the role of the DSR is to link DS class to target DO class at runtime. The DSR identifies which DS should be used to generate target DO dynamically during processing.

The DSO and TDO are two different entities, where the class for each is configured with different definitions/interfaces. Each DSO (which is an instance DS) generates a specific target DO(s). For example, DSO can be a separate entity that has a reference to a class of type well. As a particular example, a DS (such as, a "Well data source") instantiates a target DO (such as, the TDO A1 108—a "Well 1" as in FIG. 2, 204) when requested.

In some implementations, the SAM can use relationships including both one-to-one and one-to-many to enhance the modeling of a domain. Further, transaction management (for example, attributes) can be added to the relationships to improve overall processing and data transfer performance. The transaction management can be used to fetch target DOs for read/write access. Paging of results can also be performed if a number of target data objects exceeds a predefined limit (either statically or dynamically defined). The paging of the result can allow for handling large datasets.

Transaction management is a mechanism that permits processing of a set of operations to be executed as a single unit. The SAM is enhanced to permit a set of operations that can be applied to a set of DOs (such as, save, update, or delete) to be committed or rolled back to data repositories as one unit. The SAM also needs to be enhanced to handle a large amount of records (DOs) that could be generated by data sources (for example, by using a paging mechanism that manages a computer operating system memory.

To enhance overall modeling of a domain, a set of known software design patterns can be supplied for use to enable building reusable software components (for example, SINGLETON, FACTORY, INTERFACE, or FACADE). In some implementations, software design patterns can be custom designed for specific domains and implemented for use by the SAM.

Figure 2:
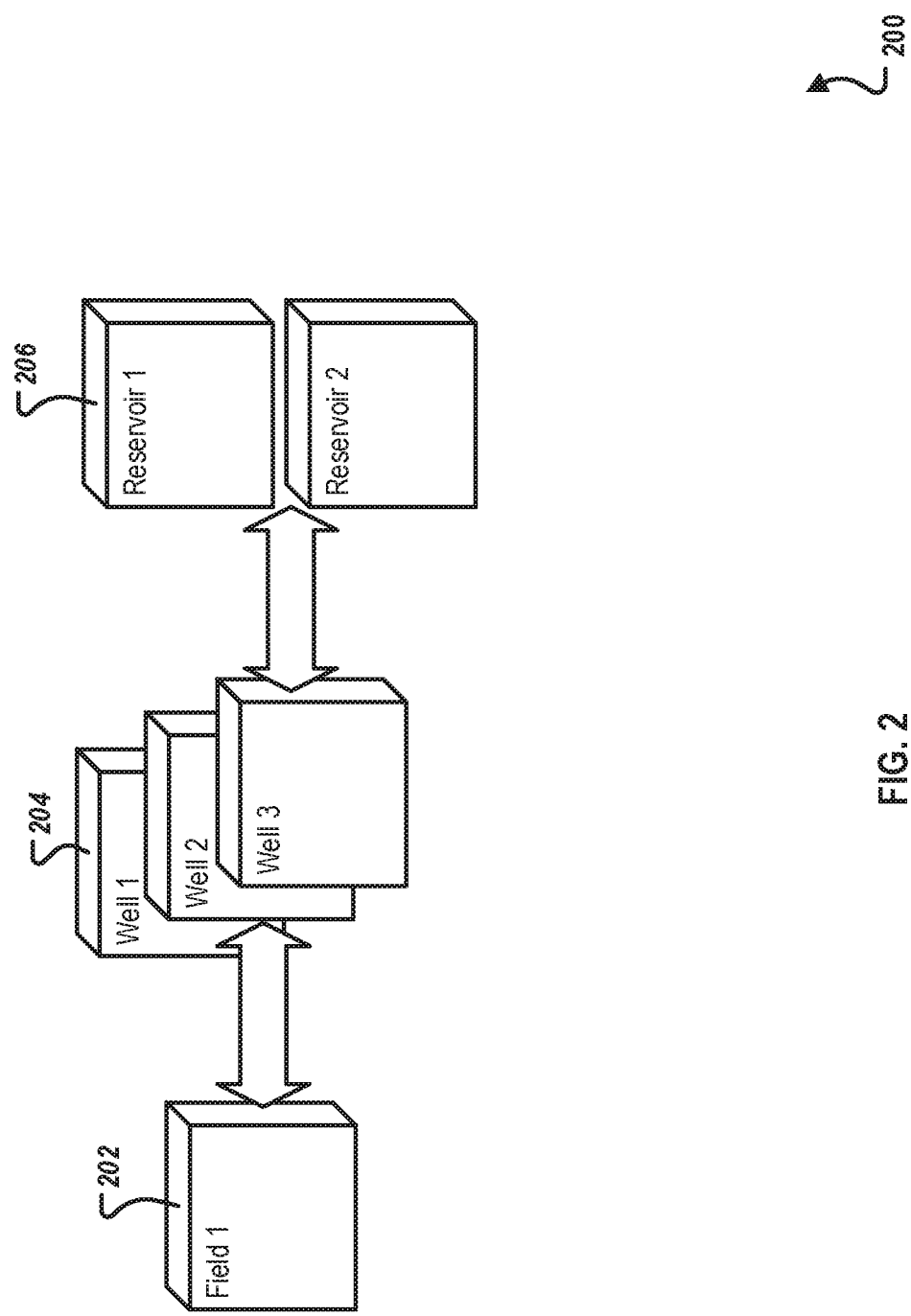
FIG. 2 is an illustration of DO instance relationships consistent with the described SAM, according to an implementation of the present disclosure.

FIG. 2 is an illustration 200 of data object instance relationships consistent with the described SAM, according to an implementation of the present disclosure. Three types of data objects instances are illustrated with relationships, Field 202, Well 204, and Reservoir 206. In the illustration, the instance of Field 1 202 is a reusable DO because it implements a certain interface and encapsulated data which can be reused as-is by other software components. The Field 1 202 DO can locate/fetch associated Wells 204 (using a CRO with a "Well" DO) and locate/fetch a subset of its Wells 204 based on a filter (for example, a Filter 112) defined on the CRO. Further, the instance of the Wells 204 (for example, Well 1) can be considered a reusable Object because it implements a certain interface and encapsulated data. A Well 204 can locate/fetch a Field 202 (here, Field 1) where it belongs using the CRO with a "Field" DO), locate/fetch all Reservoirs 206 from which it produces using the CRO with a "Reservoir" DO, and locate/fetch a subset of its Reservoirs 206 with a filter defined on the CRO). All DOs (that is, attributes and its embedded operations), in addition to their relationships, can be used by the AC or client applications to perform view, search, update, or delete operations.

Figure 3:
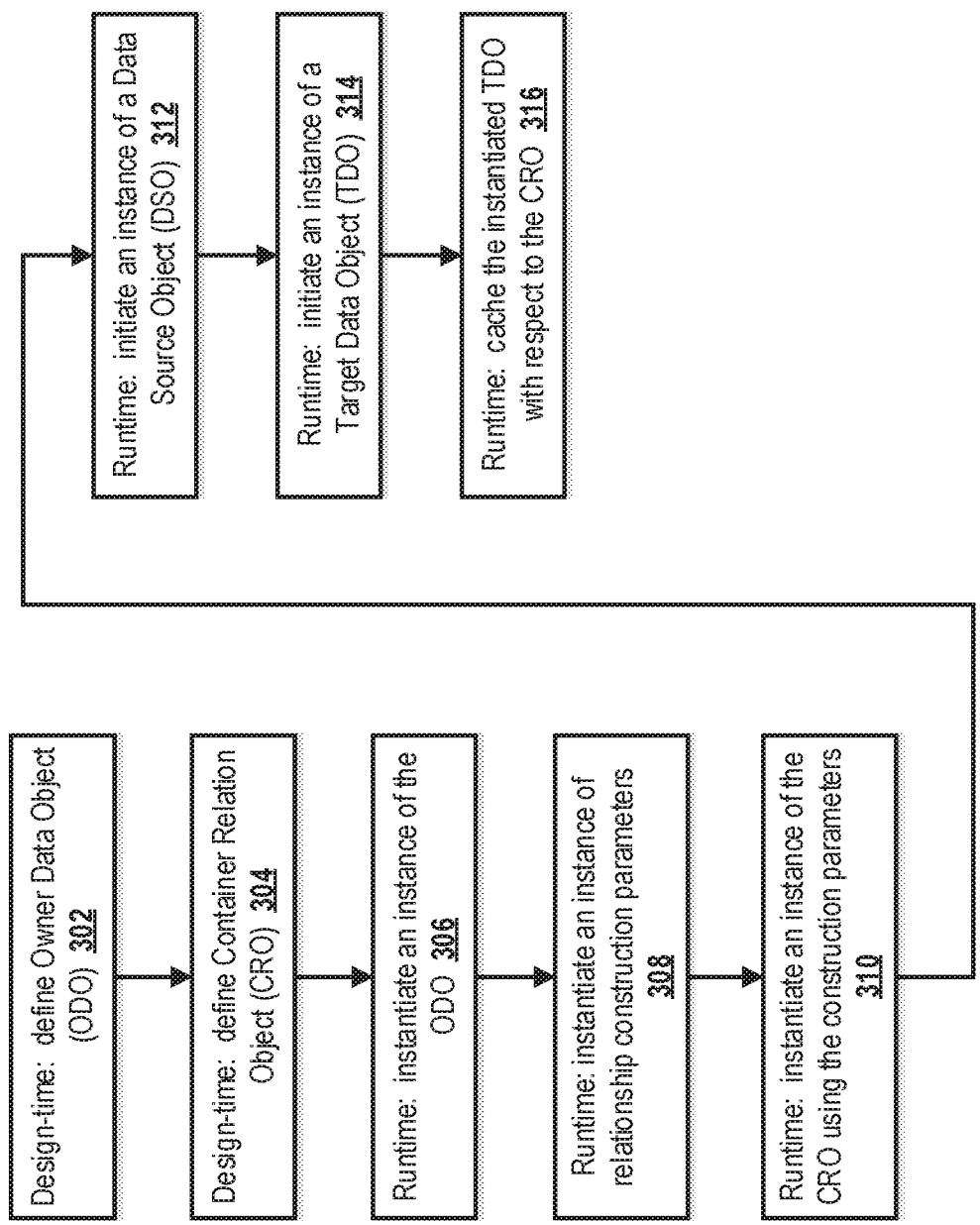
FIG. 3 is a flowchart illustrating an example SAM for optimizing software implementations of a Process, according to an implementation of the present disclosure.

FIG. 3 is a flowchart of an example software architecture method 300 for optimizing software implementations of rapidly developed or changing processes, according to an implementation of the present disclosure. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At 302, design-time: an ODO is defined. The ODO is a parent DO for another DO. Each DO has a parent DO, except the root where a parent is an Application Component (AP). For example, referring to FIG. 2, Field 1 202 is a root DO generated by the Application Component (AP). Field 1 202 is an ODO because it is a parent for a Well 1 DO. Well 1 204 is an ODO because it is a parent for a Reservoir 1 206 DO. From 302, method 300 proceeds to 304.

At 304, design-time: a CRO is defined. From 304, method 300 proceeds to 306.

At 306, runtime: an instance of the ODO is instantiated. From 306, method 300 proceeds to 308.

At 308, runtime: an instance of defined relationship construction parameters are instantiated. The construction parameters are passed from the instance of the ODO to a CRO class constructer. In typical implementations, the construction parameters are a target DO (TDO) class and a defined Filter. From 308, method 300 proceeds to 310.

At 310, runtime: an instance of the CRO is instantiated using the instantiated construction parameters. Note that in FIG. 1, instantiation of the CRO is not illustrated. From 310, method 300 proceeds to 312.

At 312, runtime: an instance of a data source object (DSO) is instantiated based on the instantiated construction parameters. Note that in FIG. 1, instantiation of the DRO is not illustrated. Here, the relationship (CRO) dynamically locates a data source class to instantiate as the DSO using a DSR. From 312, method 300 proceeds to 314.

At 314, runtime: an instance of a TDO is instantiated. The TDO by the DSO by calling an appropriate DSO interface method. The TDO is an instance of the TDO class (such as, Field 1 202 in FIG. 2). The DSO is the factory that generates TDO(s). One DSO can generate many TDO(s). TDOs and DSOs are different entities that are configured with different specifications/interfaces. For example, as illustrated, in FIG. 1 instance TDO A1 (108) is generated by an instantiated DSO (106). From 314, method 300 proceeds to 316.

At 316, runtime: the instantiated TDO instance is cached in the CRO. For example, the TDO instance can be cached as an element of a collection container structure inherited by the CRO. After 316, method 300 stops.

Figure 4:
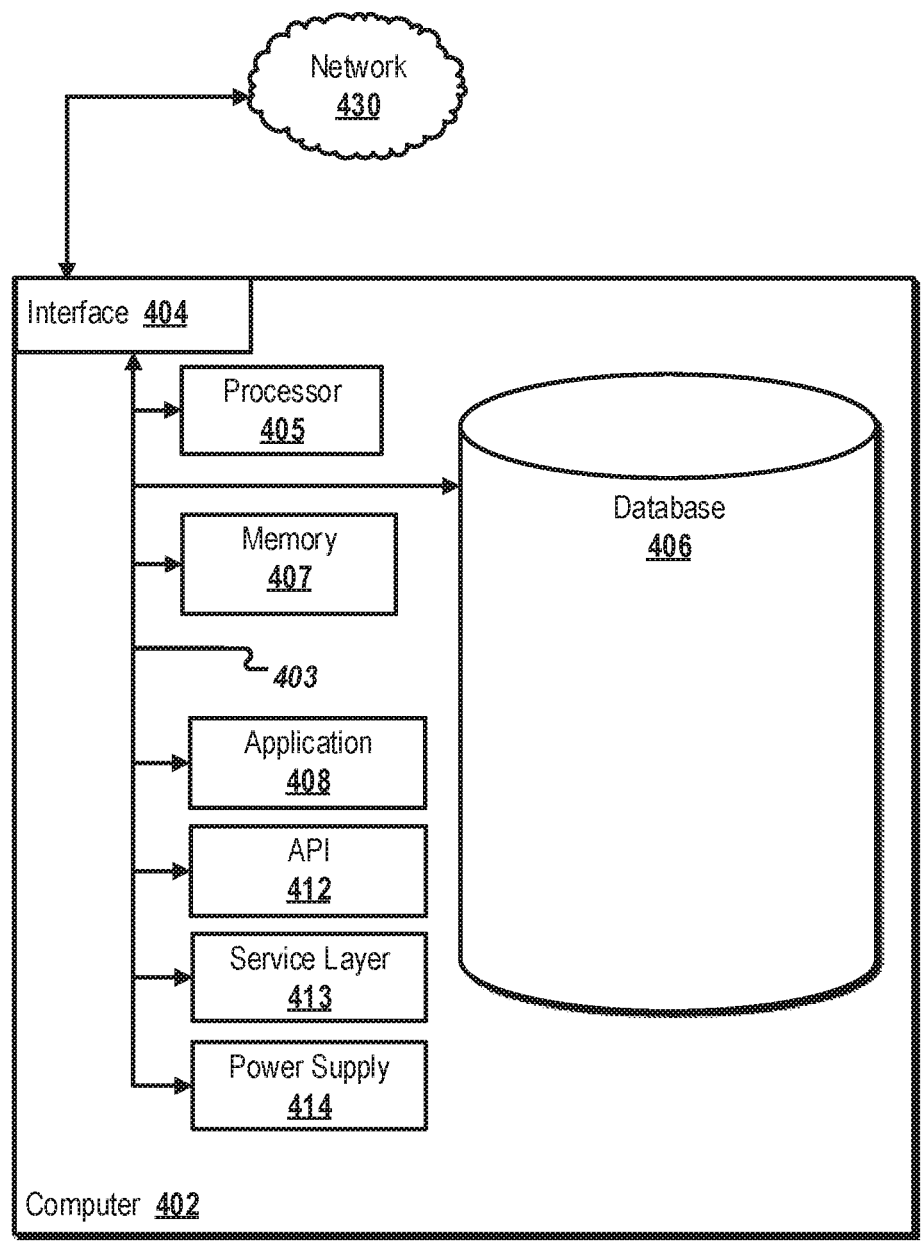
FIG. 4 is a block diagram illustrating an example computer system used to provide computational functionalities associated with described algorithms, methods, functions, processes, flows, and procedures as described in the instant disclosure, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, comprising: defining, at design-time, an owner data object and a container reference object; instantiating, at runtime, an instance of the defined owner data object; instantiating, at runtime an instance of defined relationship construction parameters; instantiating, at runtime, an instance of the defined container reference object and an instance of a defined data source object using the instantiated relationship construction parameters; instantiating, at runtime, an instance of a defined target data object by calling an interface of the instantiated data source object; and caching, at runtime, the instance of the target data object in the instance of the container reference object.

The foregoing and other described implementations can each, optionally, include one or more of the following features:

A first feature, combinable with any of the following features, wherein the owner data object is an instantiated data object that acts as a parent data object and owns a relationship with a target data object.

A second feature, combinable with any of the previous or following features, wherein the owner data object is generated by an application component.

A third feature, combinable with any of the previous or following features, further comprising defining, at design-time, the relationship construction parameters and the data source object.

A fourth feature, combinable with any of the previous or following features, further comprising passing the instantiated construction parameters from the instance of the owner data object to a container reference object class constructer.

A fifth feature, combinable with any of the previous or following features, wherein the construction parameters are a target data object class and a defined filter.

A sixth feature, combinable with any of the previous or following features, further comprising the container reference object dynamically locating, using a data source registry, a data source class to instantiate as the data source object.

In a second implementation, a non-transitory, computer-readable medium storing one or more instructions executable by a computer system to perform operations comprising: defining, at design-time, an owner data object and a container reference object; instantiating, at runtime, an instance of the defined owner data object; instantiating, at runtime an instance of defined relationship construction parameters; instantiating, at runtime, an instance of the defined container reference object and an instance of a defined data source object using the instantiated relationship construction parameters; instantiating, at runtime, an instance of a defined target data object by calling an interface of the instantiated data source object; and caching, at runtime, the instance of the target data object in the instance of the container reference object.

The foregoing and other described implementations can each, optionally, include one or more of the following features:

A first feature, combinable with any of the following features, wherein the owner data object is an instantiated data object that acts as a parent data object and owns a relationship with a target data object.

A second feature, combinable with any of the previous or following features, wherein the owner data object is generated by an application component.

A third feature, combinable with any of the previous or following features, further comprising one or more instructions to define, at design-time, the relationship construction parameters and the data source object.

A fourth feature, combinable with any of the previous or following features, further comprising one or more instructions to pass the instantiated construction parameters from the instance of the owner data object to a container reference object class constructer.

A fifth feature, combinable with any of the previous or following features, wherein the construction parameters are a target data object class and a defined filter.

A sixth feature, combinable with any of the previous or following features, further comprising one or more instructions for the container reference object to dynamically locate, using a data source registry, a data source class to instantiate as the data source object.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: defining, at design-time, an owner data object and a container reference object; instantiating, at runtime, an instance of the defined owner data object; instantiating, at runtime an instance of defined relationship construction parameters; instantiating, at runtime, an instance of the defined container reference object and an instance of a defined data source object using the instantiated relationship construction parameters; instantiating, at runtime, an instance of a defined target data object by calling an interface of the instantiated data source object; and caching, at runtime, the instance of the target data object in the instance of the container reference object.

The foregoing and other described implementations can each, optionally, include one or more of the following features:

A first feature, combinable with any of the following features, wherein the owner data object is an instantiated data object that acts as a parent data object and owns a relationship with a target data object.

A second feature, combinable with any of the previous or following features, wherein the owner data object is generated by an application component.

A third feature, combinable with any of the previous or following features, further configured to define, at design-time, the relationship construction parameters and the data source object.

A fourth feature, combinable with any of the previous or following features, further configured to pass the instantiated construction parameters from the instance of the owner data object to a container reference object class constructer.

A fifth feature, combinable with any of the previous or following features, wherein the construction parameters are a target data object class and a defined filter.

A sixth feature, combinable with any of the previous or following features, further configured for the container reference object to dynamically locate, using a data source registry, a data source class to instantiate as the data source object.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    defining, at design-time, an owner data object and a container reference object;
    instantiating, at runtime, an instance of the defined owner data object;
    instantiating, at runtime an instance of defined relationship construction parameters;
    instantiating, at runtime, an instance of the defined container reference object and an instance of a defined data source object using the instantiated relationship construction parameters, wherein the instantiating the defined data source object comprises:
        using, by the instance of the defined container reference object at runtime, the relationship construction parameters to locate a data source class from a data source registry; and
        instantiating the instance of a defined data source object using the located data source class;
    instantiating, at runtime, an instance of a defined target data object by calling a defined interface of the instantiated data source object, wherein the defined interface comprises a list of standard collection interfaces and definitions of additional methods used to locate the instantiated data source object; and
    caching, at runtime, the instance of the target data object in the instance of the container reference object.

2. The computer-implemented method of claim 1, wherein the owner data object is an instantiated data object that acts as a parent data object and owns a relationship with a target data object.

3. The computer-implemented method of claim 2, wherein the owner data object is generated by an application component.

4. The computer-implemented method of claim 1, further comprising defining, at design-time, the relationship construction parameters and the data source object.

5. The computer-implemented method of claim 1, further comprising passing the instantiated construction parameters from the instance of the owner data object to a container reference object class constructor.

6. The computer-implemented method of claim 1, wherein the construction parameters are a target data object class and a defined filter.

7. A non-transitory, computer-readable medium storing one or more instructions executable by a computer system to perform operations comprising:
    defining, at design-time, an owner data object and a container reference object;
    instantiating, at runtime, an instance of the defined owner data object;
    instantiating, at runtime an instance of defined relationship construction parameters;
    instantiating, at runtime, an instance of the defined container reference object and an instance of a defined data source object using the instantiated relationship construction parameters, wherein the instantiating the defined data source object comprises:
        using, by the instance of the defined container reference object at runtime, the relationship construction parameters to locate a data source class from a data source registry; and
        instantiating the instance of a defined data source object using the located data source class;
    instantiating, at runtime, an instance of a defined target data object by calling a defined interface of the instantiated data source object, wherein the defined interface comprises a list of standard collection interfaces and definitions of additional methods used to locate the instantiated data source object; and
    caching, at runtime, the instance of the target data object in the instance of the container reference object.

8. The non-transitory, computer-readable medium of claim 7, wherein the owner data object is an instantiated data object that acts as a parent data object and owns a relationship with a target data object.

9. The non-transitory, computer-readable medium of claim 8, wherein the owner data object is generated by an application component.

10. The non-transitory, computer-readable medium of claim 7, further comprising one or more instructions to define, at design-time, the relationship construction parameters and the data source object.

11. The non-transitory, computer-readable medium of claim 7, further comprising one or more instructions to pass the instantiated construction parameters from the instance of the owner data object to a container reference object class constructer.

12. The non-transitory, computer-readable medium of claim 7, wherein the construction parameters are a target data object class and a defined filter.

13. A computer-implemented system, comprising:
    one or more computers; and
    one or more computer memory devices interoperably coupled with the one or more computers and having tangible, non-transitory, machine-readable media storing instructions that, when executed by the one or more computers, perform operations comprising:
    defining, at design-time, an owner data object and a container reference object;
    instantiating, at runtime, an instance of the defined owner data object;
    instantiating, at runtime an instance of defined relationship construction parameters;
    instantiating, at runtime, an instance of the defined container reference object and an instance of a defined data source object using the instantiated relationship construction parameters, wherein the instantiating the defined data source object comprises:
        using, by the instance of the defined container reference object at runtime, the relationship construction parameters to locate a data source class from a data source registry; and
        instantiating the instance of a defined data source object using the located data source class;

instantiating, at runtime, an instance of a defined target data object by calling a defined interface of the instantiated data source object, wherein the defined interface comprises a list of standard collection interfaces and definitions of additional methods used to locate the instantiated data source object; and caching, at runtime, the instance of the target data object in the instance of the container reference object.

14. The computer-implemented system of claim 13, wherein the owner data object is an instantiated data object that acts as a parent data object, owns a relationship with a target data object, and is generated by an application component.

15. The computer-implemented system of claim 13, further configured to define, at design-time, the relationship construction parameters and the data source object.

16. The computer-implemented system of claim 13, further configured to pass the instantiated construction parameters from the instance of the owner data object to a container reference object class constructer.

17. The computer-implemented system of claim 13, wherein the construction parameters are a target data object class and a defined filter.

* * * * *